United States Patent [19]
Coulbourn

[11] 3,830,201
[45] Aug. 20, 1974

[54] MODULAR TEST CAGE FOR ANIMALS
[76] Inventor: John Coulbourn, R.D. 2, New Tripoli, Pa. 18066
[22] Filed: June 4, 1973
[21] Appl. No.: 366,667

[52] U.S. Cl. ............................................... 119/17
[51] Int. Cl. ............................................. A01k 1/00
[58] Field of Search ............... 119/1, 17, 19, 29, 15; 46/21; 128/1 B

[56] References Cited
UNITED STATES PATENTS
| | | | |
|---|---|---|---|
| 3,540,413 | 11/1970 | Castaigne | 119/1 |
| 3,774,576 | 11/1973 | Moore | 119/17 |

*Primary Examiner*—Hugh R. Chamblee
*Attorney, Agent, or Firm*—Fred Fisher

[57] ABSTRACT

The test wall of an animal test cage is formed in a modular manner. Interchangeable modules, including blank modules and test modules, slide within vertical tracks of the wall. The modules are held in place by a plate which partially covers the top wall of the cage. The top wall is integrally affixed to the rear wall of the cage. Each of the modules has the identical width and thickness and each has heights ranging from 1/2 to 1/4 to 1/8 the distance between the base and the top wall of the cage. Thus, testing devices can be selectively positioned about a wide range of locations on the test wall to accommodate a wide range of animals and a wide range of testing conditions.

4 Claims, 5 Drawing Figures

MODULAR TEST CAGE FOR ANIMALS

BACKGROUND OF THE INVENTION

1. Field of the Invention

This invention relates to modular test cages for animals. Accordingly, the general objects to this invention are to provide new and improved devices of such character.

Animal test cages have been used for a wide variety of laboratory organisms including rats, pigeons, squirrel monkeys, guinea pigs, Japanese and California quail, and marmosets, for example. The purchaser of an animal test cage, in the past, has selected a specifically designed test cage for a particular animal, such cage being designed to provide test elements for that particular animal whereby such elements were in a specific location designed for such animal. Thus, the purchaser, if he desired to use a test cage for a different animal, was required to purchase a different cage designed specifically for such different animal. Disadvantageously animal test cages were not available which could be used for a wide variety of animals under a wide range of test conditions.

2. Background of the Prior Art

During the course of a routine novelty search performed on behalf of the applicant, the following U.S. Pats. were found which may be of interest.

| Inventor | Patent Number | Issue Date |
| --- | --- | --- |
| Breland | 2,796,044 | June 18, 1957 |
| Palencia | 3,234,907 | February 15, 1966 |
| Evans | 3,297,324 | January 10, 1967 |
| Barney | 3,397,676 | August 20, 1968 |
| Glass et. al. | 3,467,064 | September 16, 1969 |
| Meyer | 3,516,389 | June 20, 1970 |
| Castaigne | 3,540,413 | November 17, 1970 |
| Blough | 3,602,195 | August 31, 1971 |
| Bailey et. al. | 3,611,994 | October 12, 1971 |
| Orfei | 3,626,902 | December 14, 1971 |

Though none of the foregoing patents anticipate the invention as defined by the applicant, the following are brief comments concerning the references. Breland discloses a trained animal feeder having transparent plastic walls. Palencia discloses a knock down animal cage which can be disassembled for the purposes of cleaning and sterilizing to maintain a clean environment. Evans shows an animal cage including transparent walls. Barney discloses an experimental animal cage. Glass et al. discloses a primate cage for animals including a portion thereof which swings in a door-like fashion in order to confine the animal for treatment with a bar lever controlling the operation of a swinging door which is held in various positions by a latch. Meyer discloses an experimental modular animal maze wherein his modules can be removed and washed in suitable washing compounds to remove odors and the like so that the maze can be reconstructed without giving the animal any clue as to the maze construction. Castaigne shows an apparatus for studying the behavior of laboratory animals including a transparent plastic wall. Blough discloses a cage for baby animals wherein one wall thereof is pivotable by the head of a baby animal to disclose a trough of food for the animal. Bailey et al. disclose a foldable animal shipping container, and Orfei discloses an observation cage for animals including a transparent wall.

In the past, other manufacturers have semi-permanently mounted on a wall, in the process of manufacture, those devices which are collectively called "intelligence devices," that is, stimulus and response devices consisting generally of lamp displays, projector pattern displays, speakers, levers, pecking keys, and other types of operanda on which responses are made. With such devices of the prior art, the test wall was an integrally manufactured portion of the cage. The intelligence devices mounted on it were an integrally manufactured part of the cage constructed at the factory with a limited ability for the user to move them around. With other devices of the prior art, a wall itself may be removable, but the intelligence devices mounted thereon were installed at the time of manufacture and were difficult, if not impossible, to be removed by the user.

SUMMARY OF THE INVENTION

In accordance with applicant's invention, a modular test cage is provided for a wide variety of animals, with a behavioral repertoire compatable with different modules which can be provided.

The advantages of such a modular test cage are threefold:

First, to offer the most convenience in configuration to the user in initial selection and subsequent modification of the test environment.

Second, to provide a simple and economic means of meeting individual preferences and requirements in the stimulus response devices required and their locations vis-a-vis symmetry, height from the floor, and number of devices, and to do all this with standard "off the shelf" units without resorting to specially built environments with their attendant high costs and long deliveries.

And third, to provide the users with readily available individual devices which they may add to the test cage at any time to increase the complexity of the environments or to change over to another organism or to purchase separately without complicated ordering to add to their own cages.

With such a modular scheme, any user, ranging from a laboratory instructor with requirements in undergraduate laboratory instruction and individual projects to a large research laboratory with a variety of projects, may view the environmental apparatus in much the same way users have come to consider modular programming equipment. Individual devices can be shelved, shuffled about the laboratory from cage to cage, and custom environments can be constructed in minutes with the desired modules. Individual modules can be purchased when and only when they are needed.

Special devices, when required, can be purchased or otherwise provided with the economy of paying only for the device itself and not for the special handling and fabrication of an entire cage. The user can also use the blank panels to make special devices himself.

With a modular concept as taught by the applicant hereof, each intelligence device is mounted on a module which slips into a set of tracks which are a part of the cage and only incidentally, in their installation, do they form a complete barrier which may be defined as a wall or a confining portion of the cage. Advantageously, the user can reconfigure his intelligence any way he desires and can adjust the height of levers or other intelligence devices by putting small or large panels under it, lifting it high or low off the floor. The user can install any number he desires, with a variety of different test elements, providing a variety of different heights from the floor in any of three vertical track positions.

In accordance with this invention, the user of the cage can change an entire intelligence wall of the cage to accommodate the testing requirements from that of a rat to that of a pigeon without having to purchase an entire new cage.

Thus, the primary purpose of this invention is to provide a novel test cage for animals, wherein one of the walls of the test cage is modular in concept to provide for a wide variety of test elements located in a wide variety of positions to accommodate a wide variety of animals.

Accordingly, it is an object of this invention to provide a novel test cage for animals which can be used with a variety of different animals.

Another object of this invention is to provide a novel test cage for animals wherein a large variety of tests can be performed on a specific animal.

An additional object of this invention is to provide a novel test cage for animals which is suitable for a wide variety of tests and animals at a lower cost than those heretofore provided.

In accordance with one embodiment of this invention, a cage for testing animals has a wall thereof containing test elements for such animals. a base, a top wall and additional walls, wherein the improvement resides in the test wall containing modular panels having heights selected from the group ½, ¼, and ⅛ the distance from the base to the top wall and wherein a portion of the modular panels contain animal testing elements and the remainder of the modular panels are blank panels.

In accordance with an improvement of this invention, the test cage can include a first vertical structure coupled to the base and to the top wall at the intersection of the test wall and one of the additional walls, a second vertical structure from the base to the top wall at the intersection of the test wall and the second of the additional walls, and a third and a fourth vertical structure wherein each is affixed to the base and the top wall. The structures are so spaced that they are coaligned, the spacing between each adjacent structure being essentially equal to each other. The width of each of the modular panels are equal to ¯ of the width of the test wall. Means are provided for coupling the modular panels to the structures to from the test wall.

In accordance with another embodiment of this invention, a base is provided for an animal test cage. A rear wall and top wall are integrally formed together and coupled to the base. The top wall includes four extending spine elements. Four vertical structures are each affixed to the base, wherein adjacent ones of the structures are equally spaced from each other, the structures being in cooperataing relation with the spines of the top wall. Means are provided for coupling the spines to the structures. A first side wall is coupled to the base, the rear wall and the top wall and the first vertical structure. A second side wall is coupled to the base, the rear wall and the top wall, and the fourth vertical structure. A first plurality of modular blank panels and a second plurality of modular test panels each has a fixed width and each has a height selected from the group of ½, ¼, and ⅛ of the distance from the base to the top wall. Means are provided for coupling the panels to the structures.

In accordance with certain features of this invention, the means for coupling the panels to the structures can include vertical grooves in the vertical structures so that the modular panels can be inserted thereinto and reside within the grooves of adjacent structures. In accordance with other features of the invention, a cover plate can be provided having a tongue and a pair of bolt receiving holes so that a pair of bolts can couple the cover plate via the bolt holes to the first and fourth structures so that the tongue resides in cooperating relationship under the top wall between the second and the third spine.

BRIEF DESCRIPTION OF THE DRAWINGS

Other objects, features, and advantages of this invention will become more apparent from a reading of the following specification, when read in conjunction with the accompanying drawings wherein.

DETAILED DESCRIPTION OF AN EMBODIMENT OF THIS INVENTION

Figure 1:
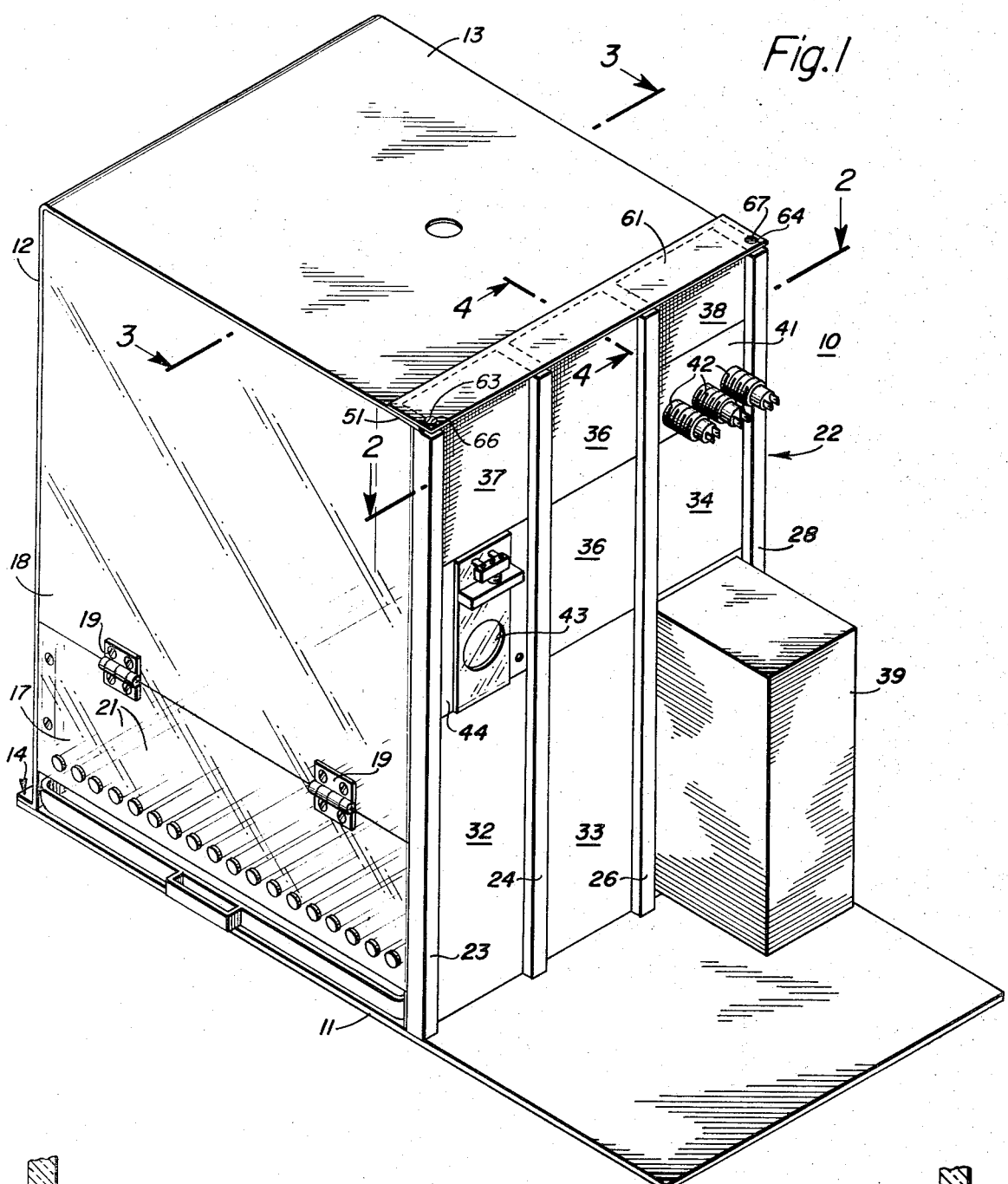
FIG. 1 is a perspective view of one embodiment of this invention.
Figure 2:
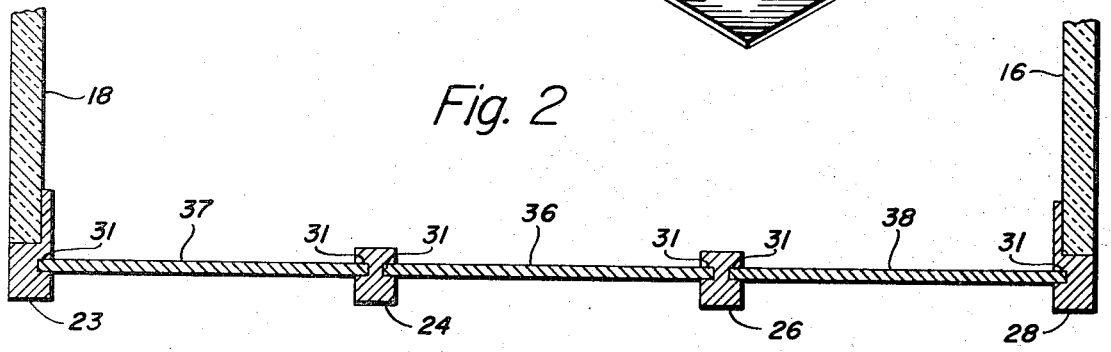
FIG. 2 is a sectional view taken along the lines 2—2 of FIG. 1.

Referring to the drawings, especially FIG. 1, there is shown a test cage 10 for laboratory animals. The animal test cage 10 includes a flat base 11 and further includes a rear wall 12 and a top wall 13 which are integrally formed together. The rear wall 12 and the top wall 13 can be formed by molding or bending a sheet of material, such as metal, in a right angular relationship. The rear wall 12 is coupled to the base 11 in a permanent manner at 14 by suitable means, as by welding, bolting, or the like. The animal test cage further includes a first side wall 16 and a second side wall 17. The side walls 16 and 17 can be formed of transparent plastic so that the animal in the cage can be visually observed. In the embodiment described hereafter, and as best shown in FIG. 1, the side wall 17 can be formed in several sections. The side wall 17 can have a hinged portion 18 which is pivotable at 19 so as to provide an entranceway for an operator to introduce items into the animal cage 10 such as the animal itself or to introduce his hand into the cage for one or more purposes. The non-conductive side wall 17 can be coupled to an electrically conductive floor structure 21—21 which is isolated from the base 11. The floor structure 21—21 can be a plurality of parallel metal bars so that the bars can be provided with electrical current, if desired, to shock the feet of an animal in the cage.

The foregoing description, as hereinabove set forth, delineating a portion of an animal cage, relates to that portion of the cage 10 which is substantially fixed in configuration and which is, generally, unalterable.

The cage 10 contains, essentially, a single test wall 22 which is modular in concept. The test wall includes a first vertical structure 23 which is affixed to the base 11 and forms a corner with the wide wall 17. Other vertical structures 24, 26, and 28 are provided whereby the vertical structures 23, 24, 26, and 28 are all coaligned with one another and spaced equally apart. The vertical structure 28 is located at the corner of the cage associated with the side wall 16. The vertical structure 28 mates with the side wall 16 in a permanent manner. Each of the vertical structures 23, 24 26, and 28 is affixed to the base 11.

The two inner vertical structures 24 and 26 each has grooves 31—31 vertically oriented at opposite sides of the structure while the corner vertical posts 23 and 26 have a single groove vertically oriented along the inner side of the respective vertical structures.

The distance between the vertical structures 23 and 24 is equal to the distance between the vertical structures 24 and 26 and is likewise equal to the distance between the vertical structures 26 and 28. The grooves of the vertical structures 23, 24, 26, and 28 are formed such as to permit modular panels to slide within such grooves.

The modular panels take broadly two configurations: one, the modular panels can be plain and unadorned and can be provided in various heights. For example, as depicted in FIG. 1, the modular panels 32 and 33 each has a height equal to one-half the distance from the base 11 to the top wall 13.

The modular panels 34, 36, and 37 each has a height equal to one-quarter the distance from the base 11 to the top wall 13 and the modular panel 38 has a height equal to one-eighth the distance from the base 11 to the top wall 13. All of the modular panels 32, 33, 34, 36, 37, and 38 have the identical width and thickness.

The remaining modular panels can all be generically termed test panels and can be provided in three different sizes: one-half, one-quarter, and one-eighth the distance from the base 11 to the top wall 13.

The modular test panel 41 can be a device for testing the response of a bird and can include three illuminated switches 42—42. The switches 42—42 can be coupled to suitable electrical apparatus and the front of the switches 42—42 can be provided with suitable bulbs for displaying various colored lights. The bird, upon touching one of the colored lights, provides a given signal to the suitable test apparatus. The switches 42—42 are maintained along a horizontal line which is off center from the central horizontal axis of the modular panel 41 so that the height of the three switches 42—42 can be effectively changed by turning the modular panel 41 upside down.

It will be noted that the switches 42—42 can be maintained in either one of 48 different locations. The switches 42 can be maintained in either one of the three vertical tracks, that is, between the vertical structures 23–24 of the vertical structures 24–26 or the vertical structures 26–28. The distance from the base that the switches 42—42 can be maintained can be varied by placing the modular panel 41 either directly on the base or at any integral multiple of one-eighth the distance from the base 11 to the top wall 13. Hence, the modular panel 41 can be placed in any of eight different positions from the base to the top wall and, upon turning the modular panel 41 upside down, the switches 42—42 can be maintained in any one of 16 different vertical orientations. Hence, with sixteen different vertical orientations and three different horizontal locations, 48 different positions are possible.

Figure 3:
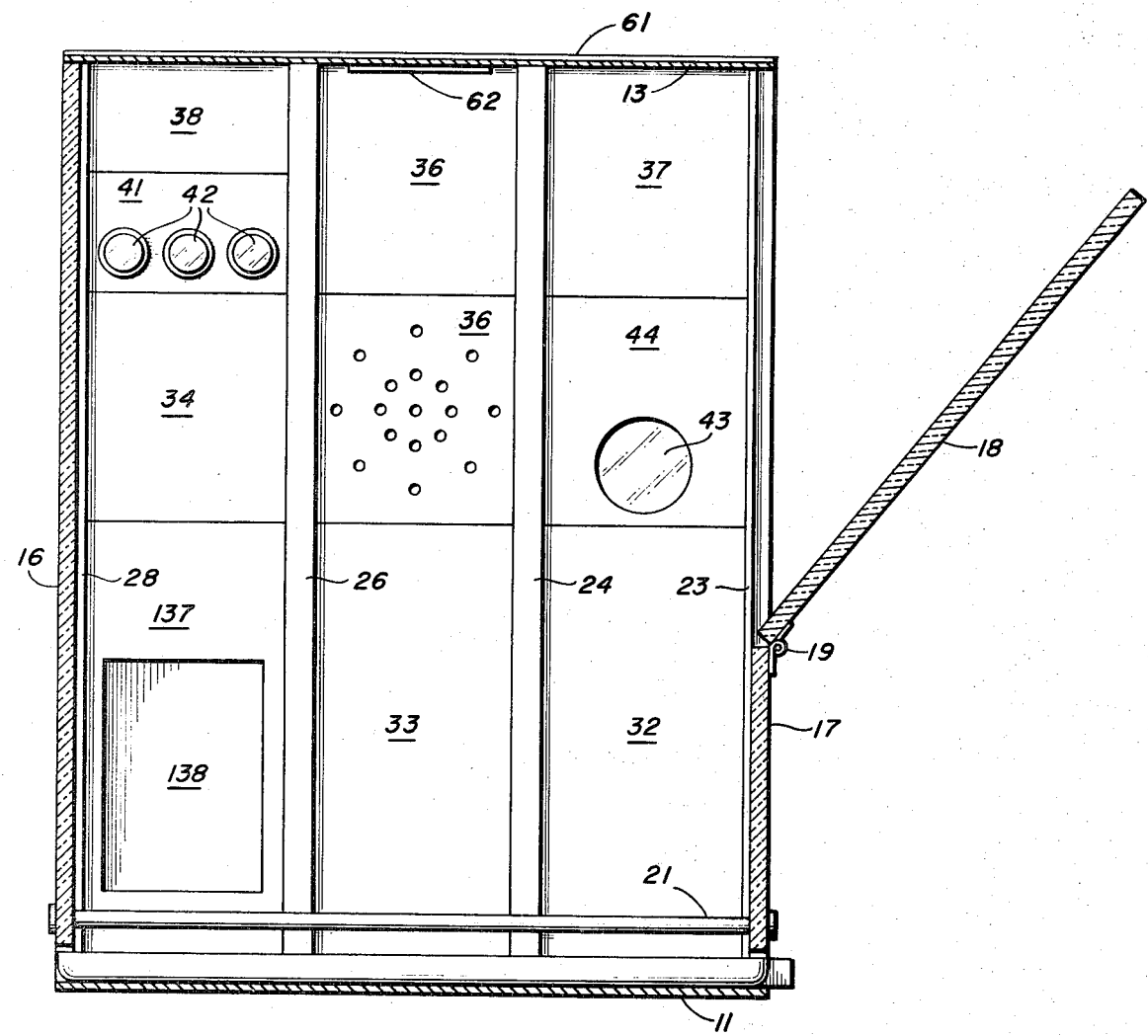
FIG. 3 is a sectional view taken along the lines 3—3 of FIG. 1.

Other types of modular test panels can be provided including a response lever 43 which is maintained on a modular test panel 44. Also, a cable modular panel 36 can be utilized, as shown in FIG. 3; and, a modular panel 137 can be provided having an entrance 138 into a container 39 which may provide a housing for food and the like. The housing 39, in an environmental condition, can be considered an isolation cubicle. The modular panel 44, being of one-quarter distance in height, can be oriented in any one of 42 different positions.

Figure 4:
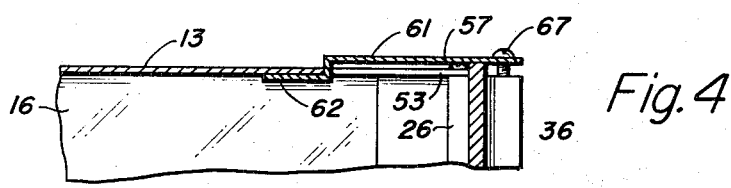
FIG. 4 is a partial sectional view taken along the lines 4—4 of FIG. 1.
Figure 5:
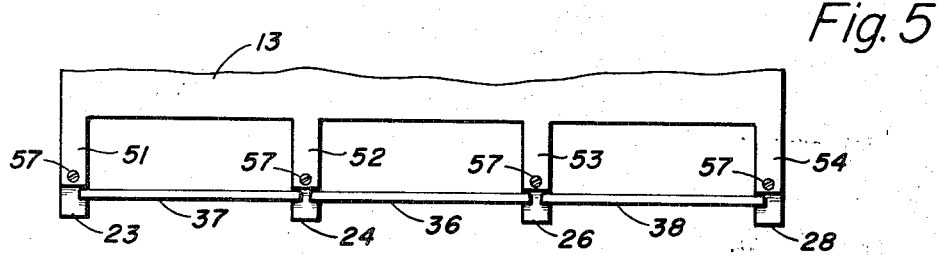
FIG. 5 is a partial plan view of the top wall of the embodiment shown in FIG. 1.

The top wall, as shown in FIGS. 1, 4, and 5, is affixed to each of the vertical structures 23, 24, 26, and 28. The top wall includes a plurality of extending spines 51, 52, 53, and 54. Each of the spines 51 through 54 is coupled to the respective vertical post 23 through 28 by suitable means such as a bolt 57, shown in FIG. 4. The coupling of the top wall 13 to the vertical structures 23 through 28 provide for effective rigidity so that the cage 10 is soundly constructed and can retain the various types of laboratory animals. Further provided is a cover plate 61 which includes a tongue 62 and a pair of bolt receiving holes 63–64 so that bolts 66 and 67, respectively, can fit therethrough and into the respective vertical structures 23 and 28 to couple the cover plate 61 via the bolt holes 63–64 to the structures 23 and 28 so that the tongue 62 resides in cooperating relationship under the top wall 13 between the second and the third spines 52 and 53. This cover plate 61 is removable via the bolts 66 and 67 in order to permit the various modular panels to be removed, when desired.

In operation, when it is desired to re-adapt the modular test cage 10, the cover plate 61 can be simply removed by removing the bolts 66 and 67. After the cover plate 61 is removed, both the blank panels and the test panels, can be removed simply by lifting the modular panels up from the tracks between the grooves of the various vertical structures. The individual test panels and blank modular panels can be re-inserted into the various grooved tracks in any desired configuration, dependent upon both the snimal that is being tested (whether it be a rat or a bird or some other animal), and depending upon the type of test to be given to the animal (whether it be a bird pecking conditional test or whether it be a response test for a rat).

Different configurations can be used in various combinations. The switches can be placed near the top, near the bottom, in the center, or off to the side, as desired. Other than switches, pecking response levers and other desired test panels can be used in conjunction with blank panels. A wide range of configurations is possible.

While a fairly inexpensive test cage has been described providing for a high degree of modularity for various operanda conditions, wherein the modular panels are inserted by sliding within grooved tracks, it will be apparent to those skilled in the art that other types of modularity can be provided within the scope of this invention. For example, horizontal structures can be provided in lieu of vertical structures, and other modular adaptive couplings can be provided in lieu of panels sliding within grooves, such variations being performed without departing from the spirit and scope of this invention.

What is claimed is:
1. An animal test cage comprising
 a. a base;
 b. a rear wall and top wall integrally formed together and coupled to said base, the top wall including four extending spine elements;
 c. a first vertical structure affixed to said base;
 d. a second vertical structure affixed to said base;
 e. a third vertical structure affixed to said base;
 f. a fourth vertical structure affixed to said base, wherein adjacent ones of said structures are equally spaced from each other and wherein said structures are in cooperating relation with said spines of said top wall;
 g. means for coupling said spines to said structures;
 h. a first side wall for coupling to said base, said rear wall and top wall, and said first vertical structure;
 i. a second side wall for coupling to said base, said rear wall and top wall, and said fourth vertical structure;
 j. a first plurality of modular blank panels having a fixed width and each having a height selected from the group of one-half, one-quarter, and one-eighth the distance from said base to said top;
 k. a second plurality of modular test panels each having said fixed width and each having a height selected from the group of one-half, one-quarter, and one-eighth the distance from said base to said top; and
 l. means for coupling said panels to said structures.

2. The cage as recited in claim 1 wherein said means (1) comprises vertical grooves in said vertical structures so that said modular panels can be inserted thereinto and reside within the grooves of adjacent structures.

3. The cage as recited in claim 2 further comprising a cover plate having a tongue and a pair of bolt receiving holes, and a pair of bolts for coupling said cover plate via said bolt holes to said first and said fourth structures, said tongue residing in cooperating relationship under said top wall between said second and said third spine.

4. An animal test cage comprising
 a. a base;
 b. a rear wall and top wall integrally formed together and coupled to said base, the top wall including four extending spine elements;
 c. a first vertical structure affixed to said base;
 d. a second vertical structure affixed to said base;
 e. a third vertical structure affixed to said base;
 f. an nth vertical structure affixed to said base, wherein adjacent ones of said structures are equally spaced from each other and wherein said structures are in cooperating relation with said spines of said top wall;
 g. means for coupling said spines to said structures;
 h. a first side wall for coupling to said base, said rear wall and top wall, and said first vertical structure;
 i. a second side wall for coupling to said base, said rear wall and top wall, and said nth vertical structure;
 j. a first plurality of modular blank panels having a fixed width and each having a height selected from a group of fractions of the distance from said base to said top;
 k. a second plurality of modular test panels each having said fixed width and each having a height selected from a group of fractions of the distance from said base to said top; and
 l. means for coupling said panels to said structures, and wherein n is an integer greater than 3.

* * * * *